Feb. 17, 1948.    W. L. MUELLER ET AL    2,436,052
LOADING DEVICE FOR BAKING OVENS
Filed Dec. 20, 1944    6 Sheets-Sheet 6
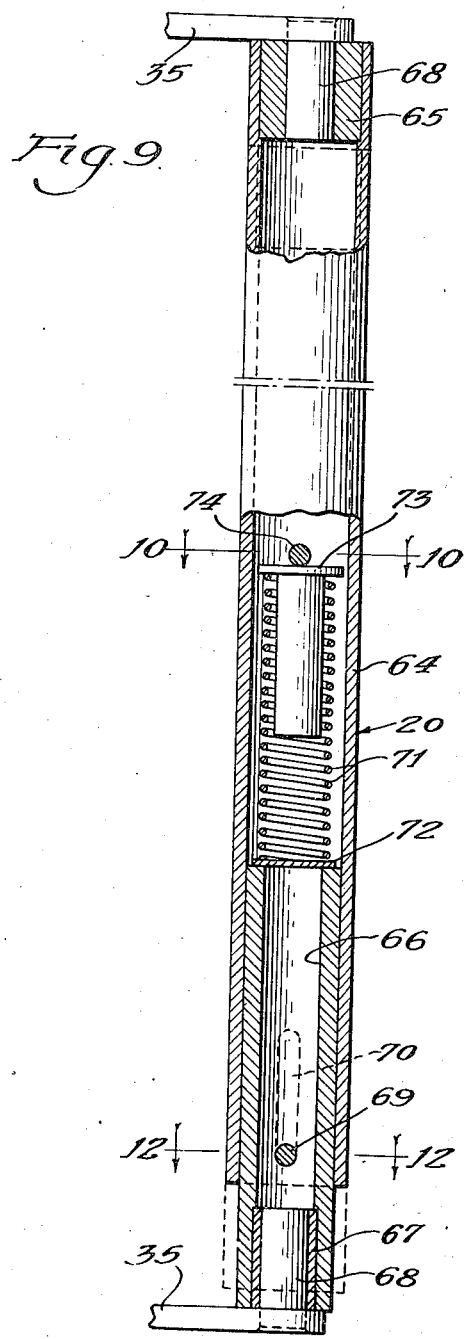
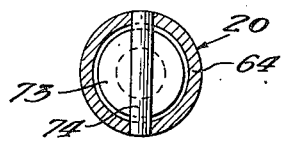
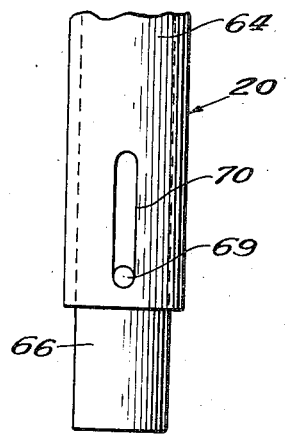
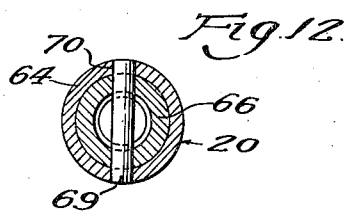
Inventors:
William L. Mueller
Carl Richard Skarin
By Bair & Freeman
Attorneys Patented Feb. 17, 1948

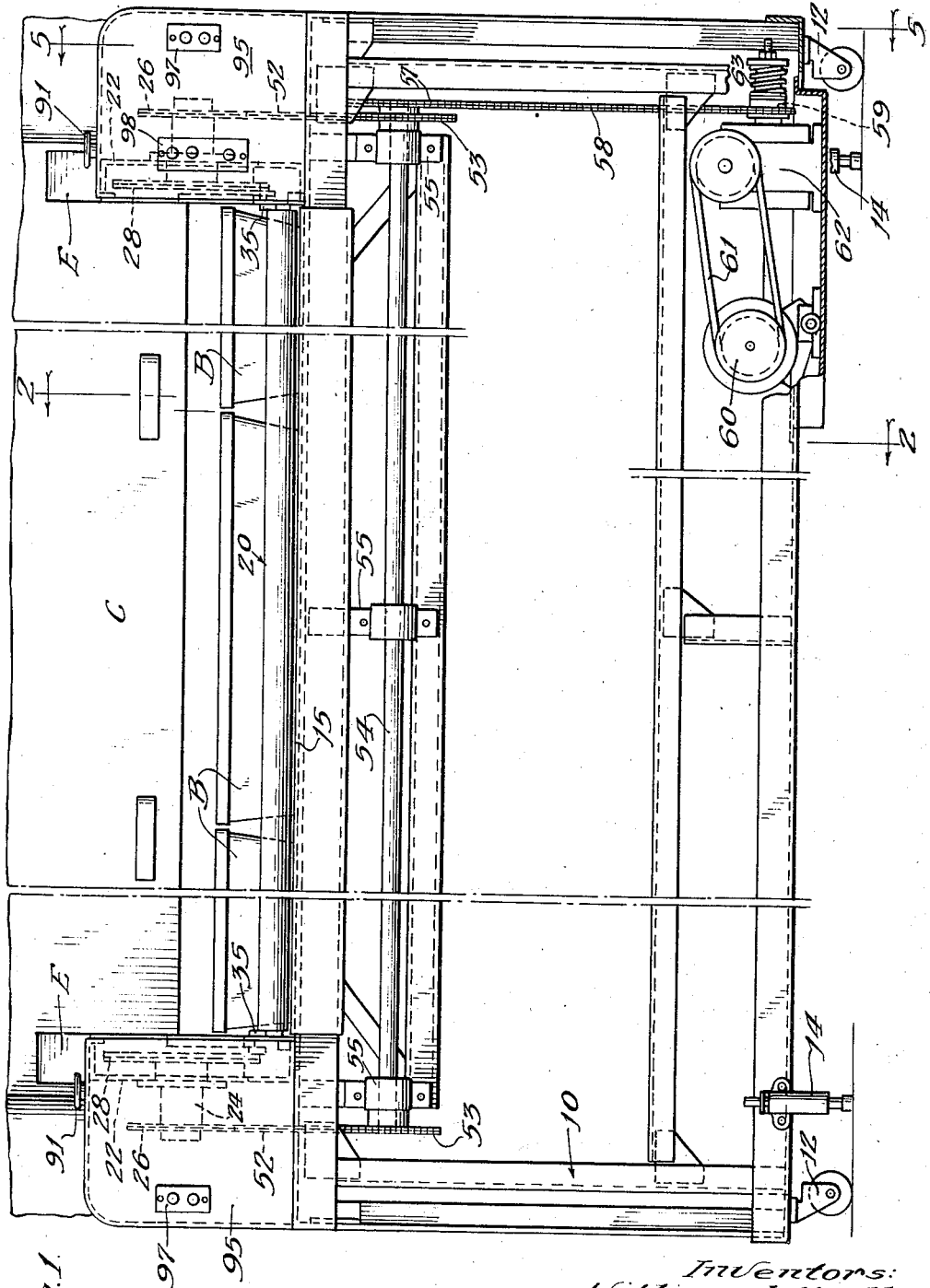

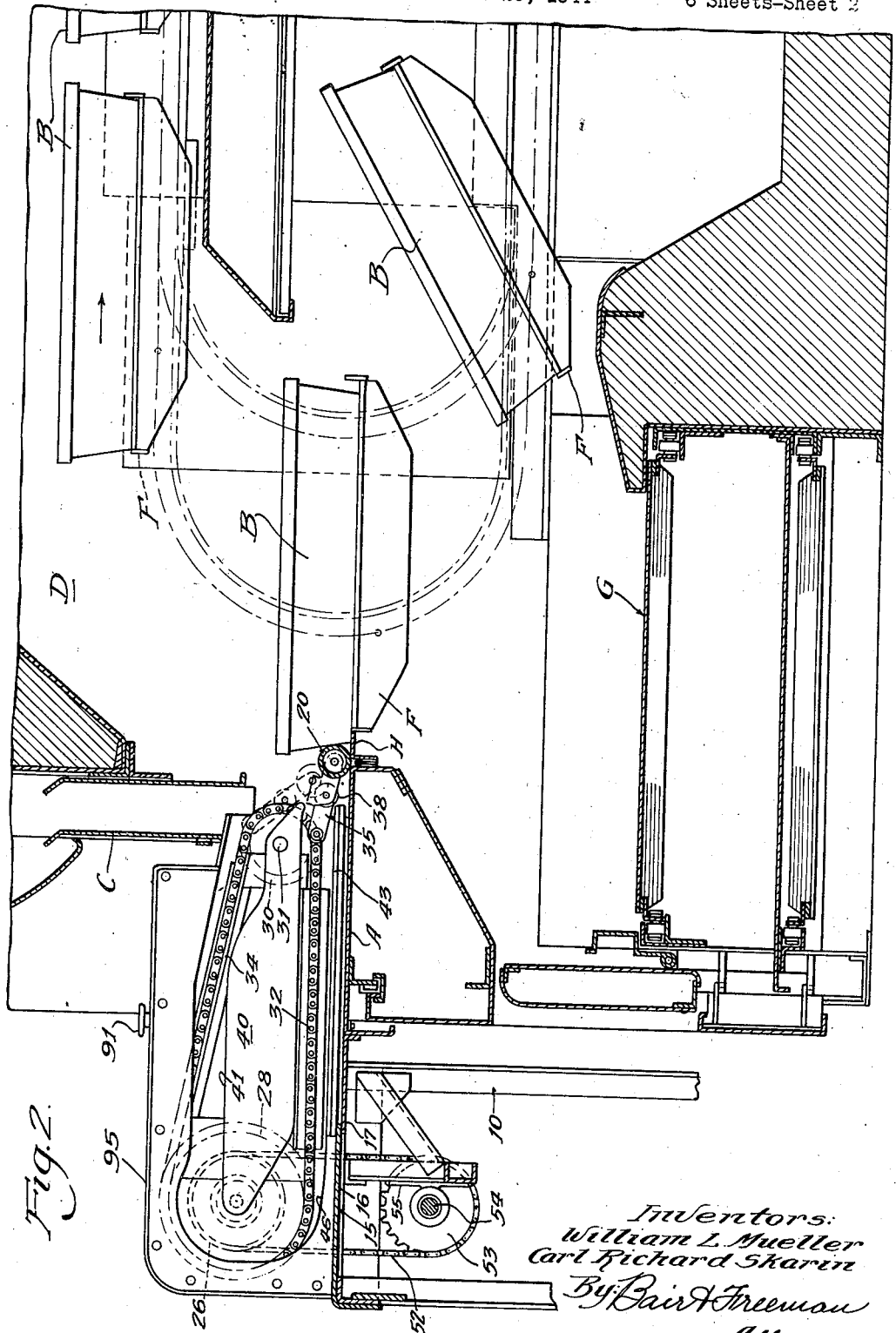

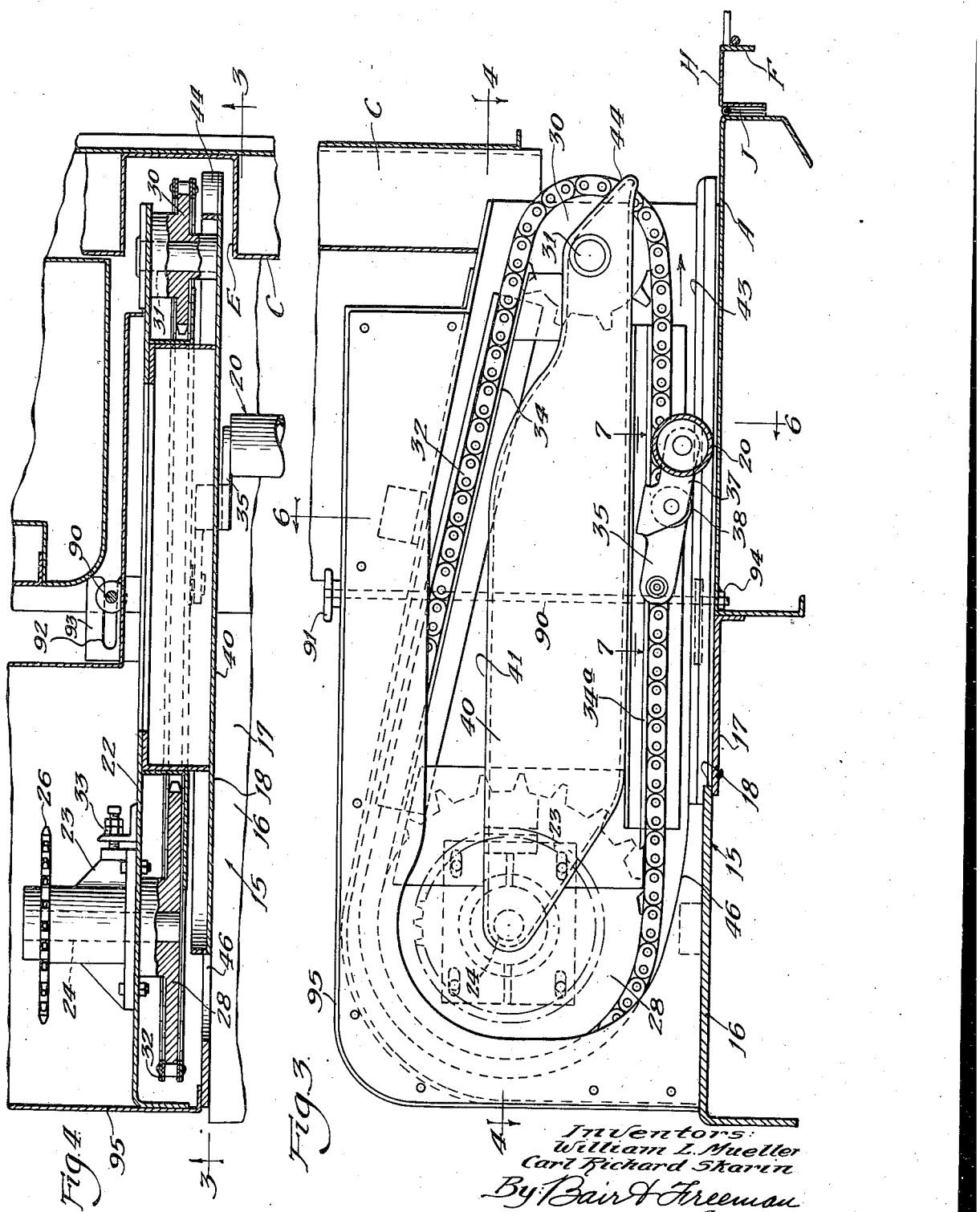

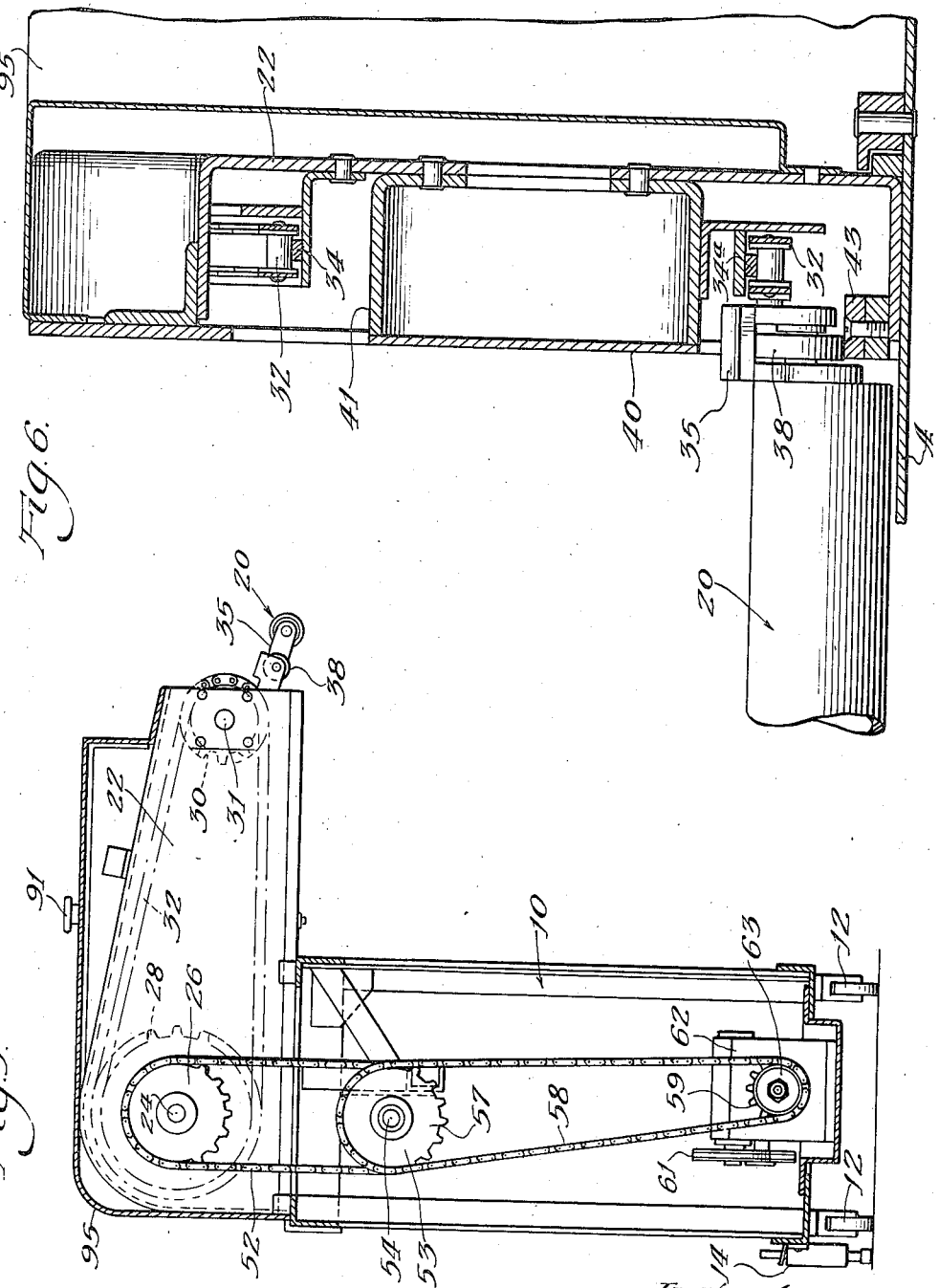

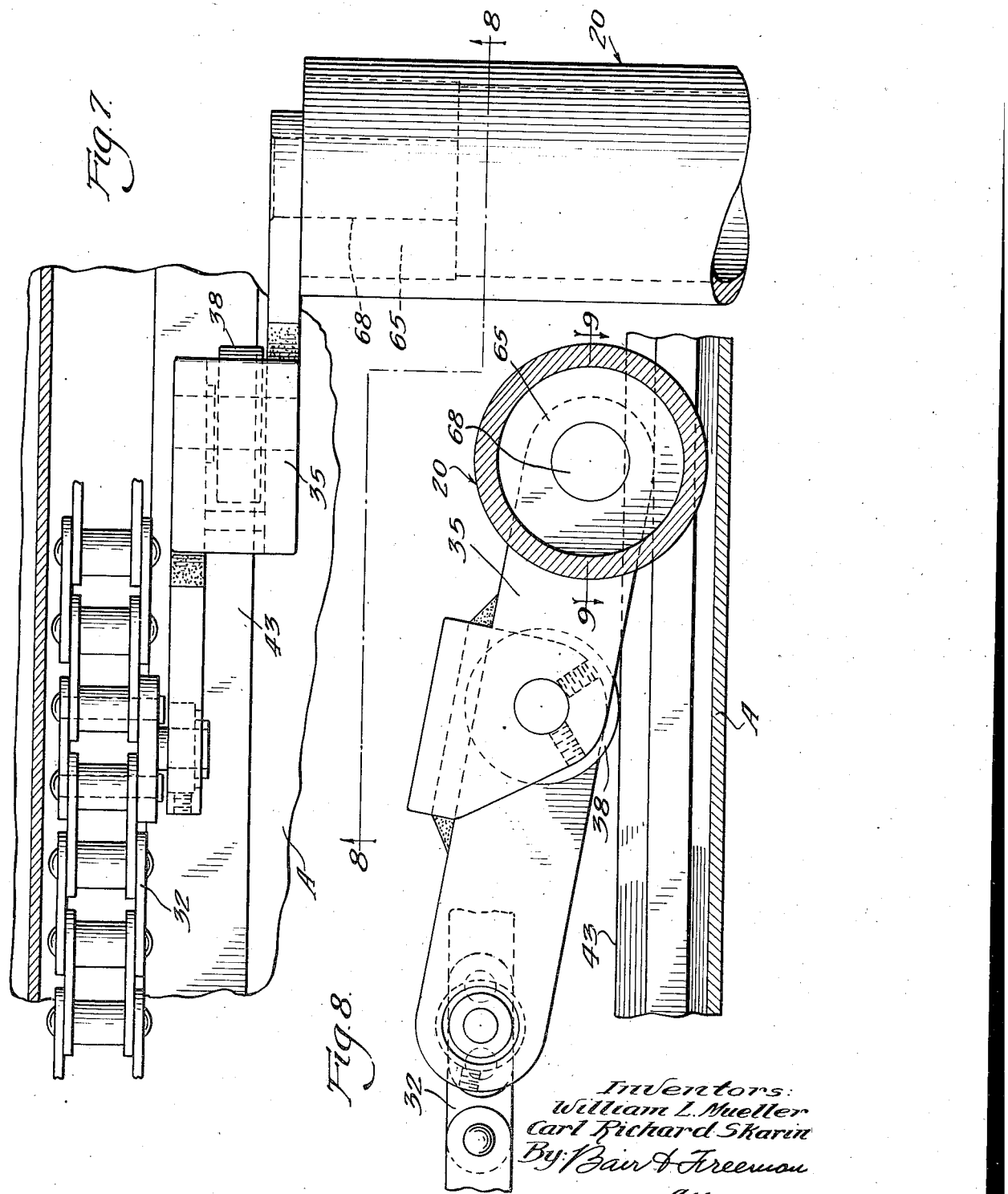

2,436,052

UNITED STATES PATENT OFFICE 2,436,052

LOADING DEVICE FOR BAKING OVENS

William L. Mueller, La Grange, and Carl Richard Skarin, Western Springs, Ill., assignors to The Petersen Oven Company, a company of Illinois Application December 20, 1944, Serial No. 569,084

7 Claims. (Cl. 107—57)

The present invention relates to a loading device for use in conjunction with commercial baking ovens of the general type having an endless conveyer traveling in a baking chamber with a portion of the conveyer disposed in close proximity to the loading opening of the oven. Such baking ovens are usually constructed and arranged so as to permit disposing of a plurality of pans of food stuff on a supporting shelf associated with the loading opening, preferably arranged initially in side by side fashion so as to permit the pans to be manually moved singly, or in groups onto the conveyer.

One widely used type of baking oven to which the present invention is particularly adaptable, employs a conveyer of the type provided with a multiplicity of spaced apart, grill type of trays, each of which is formed and dimensioned for receiving a plurality of pans of food stuff. In some oven constructions of this general type, the conveyer driving means is controlled in a manner to cause intermittent stoppage or arresting of the trays successively, in registration with the supporting shelf of the loading opening. In other oven constructions, the conveyer may be of the continuous traveling type.

Due to the construction of such ovens the matter of loading the pans of food stuff onto the conveyer or the trays thereof, requires the exertion of considerable physical effort as well as skill in effecting proper placement of the pans on the conveyer.

The loading device embodying the present invention is herein disclosed as a separate, self-contained, unitary piece of equipment which may be readily connected to or detached from operative association with a baking oven. It will be apparent, however, that for certain types of ovens the loading device may be formed as a built-in part of the oven proper.

The primary object of this invention is to provide a novel mechanical loading device of the character indicated, which is adapted to be so co-related to the baking oven as to permit rapid and accurate loading of a plurality of pans of food stuff onto the baking conveyer.

Another object is to provide a novel loading device of the character indicated, which is of a unitary, self-contained, portable nature, constructed and arranged so as to be quickly moved into and out of operative relation to the baking oven.

A further object is to provide a novel loading device of the character indicated comprising an elongated, substantially horizontally extending pusher member disposed in the loading opening of the oven, together with power operated means for moving the pusher member in a forwardly direction in close proximity to the shelf of the oven, into contact with the rear face of the pans disposed on the shelf for shifting the latter slidably over the shelf and onto the oven conveyer.

Still another object of this invention is to provide a novel loading device of the character indicated having a pusher member adapted to be positioned in the loading opening of the oven, together with means for moving the pusher member in a forwardly direction in close proximity to the shelf for engaging the pans thereon and moving the same onto the baking conveyer, and for moving the pusher member in an elevated, rearwardly traveling direction to permit disposing of additional pans of food stuff in proper position on the shelf preparatory to being engaged by the pusher member during the next forward movement thereof.

Other objects and advantages of this invention will be apparent from the following description, taken in connection with the accompanying drawings wherein:

Figure 1 is a front elevational view of the loading device embodying the present invention shown in operative relation to a baking oven.

Figure 2 is a vertical, sectional view through the loading device and the forward part of a baking oven and taken substantially, as indicated at line 2—2 on Figure 1.

Figure 3 is an enlarged, vertical, sectional view through the loading device and baking oven, adjacent one end of the device, and taken substantially as indicated at line 3—3 on Figure 4.

Figure 4 is a transverse, horizontal, sectional view of the device and adjacent portion of the oven, taken substantially as indicated at line 4—4 on Figure 3.

Figure 5 is a vertical section through the loading device per se, taken substantially as indicated at line 5—5 on Figure 1.

Figure 6 is an enlarged, vertical, sectional view through one end of the loading device and taken substantially as indicated at line 6—6 on Figure 3.

Figure 7 is an enlarged, fragmentary plan view at one end of the loading device, showing the chain belt and its operative connection to the pusher member.

Figure 8 is a vertical view part in section and part in elevation and taken as indicated at line 8—8 on Figure 7.

Figure 9 is a view part in section and part in elevation of the pusher member, taken at line 9—9 on Figure 8.

Figure 10 is a sectional view through the pusher member, taken substantially as indicated at line 10—10 on Figure 9.

Figure 11 is a fragmentary, elevational view of the end of the pusher member provided with a telescopic connection to a trunnion bearing.

Figure 12 is a transverse, sectional view through the pusher member, taken substantially as indicated at line 12—12 on Figure 9.

The loading device embodying our invention includes an upright, generally rectangular frame structure 10, made up essentially of structural members. The frame, for convenience, is mounted on a plurality of casters 12 to permit convenient movement of the device from place to place, or into and out of operative association with a baking oven. To insure proper positioning of the loading device in relatively fixed relation to the baking oven, we provide a pair of conventional, foot operated, friction stop devices 14, on the forward face of the lower portion of the frame structure, as clearly seen in Figures 1 and 3 of the drawings.

The top of the frame structure is provided with an auxiliary shelf 15 disposed substantially horizontally and adapted to be aligned with the loading shelf A associated with the loading opening of the baking oven. The auxiliary shelf includes an outer element 16, and an inner element 17, disposed below the element 16 so as to provide at the inner end of the element 16 an abutment shoulder 18 against which the pans of food stuff, as indicated at B, are adapted to be initially positioned in a proper relation to be engaged by an elongated, horizontally disposed, forwardly movable pusher member 20.

Mounted on the frame structure 10, at each end, are separate synchronized drive means for actuating the pusher member 20, which is first caused to move in a forwardly direction, in relatively close proximity to the auxiliary shelf 15 of the loading device and the shelf A, of the baking oven, and is further caused to move in an elevated, rearwardly direction, in a cyclic manner for repeat engagement with a plurality of pans B positioned on the shelf elements.

The drive means at opposite ends of the frame structure are substantially identical, but oppositely disposed, and the description of one driving means, as far as practical, will suffice for both. Each drive means includes a supporting frame 22, on which is adjustably mounted a bearing 23 for a horizontal shaft 24, on the outer end of which is fixedly mounted a sprocket wheel 26. Fixedly mounted on the inner end of the shaft 24 is a sprocket wheel 28. Disposed in alignment with the sprocket wheel 28, at the forward end and on the same side of the frame member 22, is a sprocket wheel 30, journalled on a stud 31, fixedly mounted on the forward end of the frame member 22. Trained around the sprocket wheel 28 and 30 is a roller chain 32 which is preferably relatively taut, and proper tension in the chain is maintained by a conventional screw adjustment, as indicated at 33, associated with the bearing 23. The upper run of the chain is guided on and rolls over a track member 34 connected to the frame 22 and the lower run of the chain engages the track 34a.

Pivotally connected at one end to the chain 32 of the drive means, as clearly seen in Figures 7 and 8, is a control arm 35, the opposite end of which is operatively connected to the pusher member 20. The forward portion of the control arm, adjacent the pusher member 20 is disposed in an inwardly offset relation, as indicated at 37, to the remaining portion of the arm. A guide roller 38 is pivotally connected to said arm intermediate the main offset portions thereof. Said guide rollers, as will be presently described, serve to control the path of travel of the pusher member 20.

Fixedly attached to the frame member 22 of the drive means, is a cam 40, of elongated form, the upper surface of which, as indicated at 41, is of irregular contour and is adapted to be engaged by the guide roller 38 of the control arm for controlling the elevated path of travel of the pusher member 20. When the control arm is on the lower run of the chain, such as seen in Figure 3 of the drawings, the guide roller 38 travels over a horizontally, extending track element 43, the forward end of which terminates substantially in vertical alignment with the nose portion 44 of the cam 40. The opposite end of said track element 43, merges ino an arcuate guide track 46, over which the guide roller likewise travels after it disengages from the rear end of the upper surface of the cam member 40.

It will now be seen that as the chains 32 travel around the respective pairs of sprocket wheels 28 and 30, the control arms, due to the engagement of the guide rollers 38, traveling over the track 43, supports the pusher member 20 in relatively close proximity to the auxiliary shelf elements 16 and 17 and the shelf element A of the baking oven. As the chain moves forwardly so that the rollers 38 ride off of the forward ends of the track 43, the arms 35 swing downwardly about their pivot connections to the chains 32 so that the pusher member 20 is brought into contact with the forward portion of the shelf A of the baking oven for purposes as will hereinafter be described. The travel of the chains causes the pivot connections thereof with the control arms to travel in an upwardly direction around the end sprocket wheels 30, which movement causes the pusher member 20 to dwell or remain substantially stationary for a period during the time the pivot axes of the arm approach and pass beyond the horizontal plane through the axes of the shafts 31. As such movement occurs, the pusher member 20 is gradually raised until the guide rollers 38 engage the nose portions 44 of the cams 40. Continued movement of the chains, due to the engagement of the guide rollers 38 with the contours 41 of the cams, results in raising the pusher member 20 and simultaneously moves it in a rearwardly direction. As the pivot connection of the arms 35 with the chains 32 travels around the sprocket wheels 28, the guide rollers ride off of the rear ends of the cam surfaces 41 and the arms then assume a substantially vertical position until the guide rollers 38 engage the curved tracks 46, and continued movement of the chains, causes the rollers 38 to engage and follow the tracks 43. Such movement causes the control arms to again assume a forwardly and downwardly inclined position substantially as seen in Figure 3 of the drawings.

The two separate drive means at opposite ends of the supporting frame structure are synchronously driven through similar drive connections, comprising chains 52 trained around the sprocket wheels 26 and the aligned sprocket wheels 53, disposed below the sprocket wheels 26. Each of the sprocket wheels 53 is mounted on and keyed to a common horizontally extending shaft 54, journalled in bearings 55 on the frame structure 10. As may be seen in Figure 1 of the drawings, the right hand end of the shaft 54 has fixedly mounted thereon a sprocket wheel 57, driven by a chain 58 from a sprocket wheel 59 associated with the driving mechanism mounted at the lower right hand portion of the framing structure 10. The driving mechanism includes an electric motor 60, which through a belt 61 drives a speed reducing mechanism 62, which in turn transmits motion through a friction slip clutch device, indicated generally at 63, with which the sprocket wheel 59 is operatively connected. The purpose of providing the friction slip clutch is so that in the event the pusher member for some reason or other encounters an abutment, the drive connection thereto will slip. More particularly, the special clutch is provided as a safety device so that in the event the pusher member 20 engages the arms or hands of an operator placing pans on the shelf 15, the pusher member may be temporarily held against movement so that no injury will result from such contact.

The pusher member 20 is constructed and arranged so as to be quickly and easily removed from operative connection with the control arms 35 so as to enable cleansing, repair or replacement. The pusher member preferably is in the form of an elongated tube 64 provided at one end with the press fitted bearing 65, and at the opposite end with a sleeve 66, the outer end of which has a press fitted bushing 67. The two bushings at opposite ends of the pusher member are adapted to be telescoped onto trunnion elements 68 fixedly secured to the outer ends of the control arms 35, as clearly seen in Figure 9 of the drawings. The sleeve 66 is interconnected with the tube 64, for limited telescopic movement relative thereto. For this purpose the sleeve 66 is provided with an outwardly extending pin 69, registering in an elongated slot 70 formed in the tube 64. A coil spring 71 is mounted with the tube with one end abutting against a washer 72 seated against the inner end of the sleeve 66, and the opposite end of the spring abuts against a washer 73 seated against a pin 74 fixedly secured in the tube 64, as seen in Figure 9. Thus the spring 71 tends to urge the sleeve 66 in an outwardly direction and cause the pin 69 to move to the outer limit of the slot 70, as clearly seen in the drawings. To remove the pusher member 20, merely requires axial movement of the tube in a direction to compress the spring 71, resulting in movement of the tubular body 64 of the pusher member to the position indicated in dotted lines in Figure 9, at which position the opposite end of the tube has been disengaged from its trunnion 68, and the entire pusher member may then be moved laterally, and then in the opposite longitudinal direction for disengagement with the other trunnion 68.

In Figures 1, 2, 3 and 4 of the drawings we have shown our novel loading device in operative relation to a baking oven. As may be clearly seen in Figures 2 and 3, the device is so positioned with respect to the oven that the driving means at the opposite ends thereof project a distance into the loading opening of the oven. The oven, as illustrated, includes a vertically sliding door C, which when the loading device is connected in operative relation to the oven, is disposed in a position as seen in Figure 2, at a height just sufficient to afford clearance for the pans B, for movement over the shelf onto an aligned tray F. When the oven is manually loaded the door for convenience is in substantially full open position, resulting in a great loss of heat. By virtue of the construction herein disclosed, there is a minimum heat loss, from the loading opening of the baking chamber D, and hence a substantial saving of heat is effected, and in general increases economy of operation of the ovens. The door, preferably adjacent opposite ends, is provided with notched-out portions, as indicated at E in Figures 1 and 4, to accommodate the projecting portions of the respective drive means, when the door is moved to full closed position to totally close off the front end of the baking chamber of the oven. Under these conditions, of course, the loading device is inoperative and it is desired to retain the heat within the baking chamber for purposes of economy, until the next time the oven is operated. When the oven is operating and the loading device is functioning, the door is elevated to the position seen in Figures 1, 2 and 3 of the drawings, in other words at a height just sufficient to provide clearance for the pans B, together with the drive means and the pusher member 20. In the oven as illustrated in the drawings, the baking conveyer may be understood to be of a conventional type, including an endless chain conveyer on which is carried a plurality of spaced apart, grill type of individually pivoted trays F, which serve to support pans of food stuff thereon throughout a substantially complete cycle of travel of the conveyer during which the baking operation is performed. These trays are adapted to be registered with the loading shelf A, associated with the loading opening of the oven so that pans of food stuff, as indicated at B, may be moved from the shelf onto the registering trays. After the respective trays have made a complete circuit within the baking chamber, the pans may be unloaded from the trays in any convenient manner, and as shown in Figure 1 the trays are caused to be tilted as they approach the forward end of the oven so as to cause the pans of food stuff to be discharged therefrom onto a transversely extending unloading conveyer, as indicated generally at G, which unloading conveyer conveys the pans of baked food stuff laterally through the side wall of the oven. The particular type of baking and unloading conveyers and the means for unloading the pans from the trays constitutes no part of the present invention and no further description thereof is believed necessary.

Mounted at the inner edge of the shelf A of the baking oven is an auxiliary element H of generally angular cross section, as clearly seen in Figure 3 of the drawings. The element H is hingedly connected to the oven shelf and associated therewith is a spring J, normally tending to maintain the element in a position as seen in Figure 3 of the drawings so as to constitute an extension of the oven shelf A. The element H is positioned in the path of travel of the outer end of the tray F so that a marginal portion thereof is engaged by the tray. When the tray is arrested in proper position, said element H is disposed substantially flush with the oven shelf A, to form a continuation thereof so that the pans of food stuff B may be slid over the shelf A and auxiliary element H directly on the supporting surface of the registering tray. The purpose of providing a hinged connection for the element H is so that a slight amount of excessive upward movement of the tray will cause the element H to be inclined upwardly and will, as long as the element H is in engagement with the tray, provide a convenient surface over which the pans may be slid onto the trays. After the tray again moves upwardly, the auxiliary element H is disengaged from the tray and returns to the position seen in Figure 3 of the drawings.

It will now be apparent that in the use of our novel loading device the pans of food stuff B are initially placed on the auxiliary shelf 15 of the loading device, with the rear ends of the pans disposed in abutment with the shoulder 18. This results in disposing the pans in a proper position so as to be engaged by the pusher member 20 for movement forwardly, slidingly over the auxiliary shelf element 17, the oven shelf A, and auxiliary element H onto the trays F of the baking conveyer. Thus the matter of loading of pans of food stuff onto the trays of the baking conveyer may be rapidly and efficiently accomplished, dispensing with considerable physical effort on the part of the loading operators. It will be apparent that as the pusher element approaches the forward end of its movement, it is disposed in engagement with the forward portion of the oven shelf A and the element H. The purpose of such arrangement is to preclude the possibility of the pusher element tending to ride upwardly against the rear ends of the pans of food stuff. This is particularly important to avoid difficulty in connection with low height pans, such as cookie pans and the like.

The loading device may be quickly and easily connected and disconnected from operative relation to the baking oven, and for this purpose we provide a pair of connecting elements at opposite ends of the loading device in the form of rods 90, journalled in the frame structures 22 of the drive means. The upper ends of the rods are provided with hand grips 91, and the lower ends of the rods extend through guide slots 92 of brackets 93 connected to the outer side of the frames 22, and the lower ends of the rods are adapted to be threaded into the end portions of the shelf A as clearly seen in Figure 3. To insure a substantial threaded connection, we preferably weld a nut 94 onto the under side of the shelf A. This connection to the oven is further augmented by the provision of the foot operated friction stops 14, as above described.

As may be seen in the drawings, the driving means at each end of the frame structure is enclosed in a suitable sheet metal housing 95, and it is to also be understood that suitable sheet metal enclosures may be provided for the ends of the frame structure 10, as well as the drive mechanism per se, for both the purposes of safety against possible injury to persons working about such machines and for purposes of appearance.

Associated with each of the housings 95 enclosing the drive mechanism, is a switch device 97 so that an operator may readily control the starting or stopping of the drive mechanism of the device. A switch device 98 is associated with the right hand housing 95, and it may be understood to be connected into the electrical circuits for controlling operation of the drive mechanism for the baking conveyer of the oven. Thus when the oven is constructed with drive means of the type wherein the trays are caused to be intermittently arrested in registered relation with the loading shelf A, suitable limit switches (not shown) may be employed so that the loading device will likewise be co-related to the conveyer. It may be understood that the electrical circuits and switches are so arranged that the loading mechanism is intermittently operated and the pusher member 20 is caused to be arrested in a raised or elevated position at a height so as to permit the operator to conveniently load pans of food stuff on the shelf A. Preferably the pusher member 20 is arrested adjacent the forward portion of the upper surface of the cams 41 so as to afford the operator a maximum amount of time in loading the pans onto the shelf A. When the loading mechanism is again set into motion the pusher member 20 will be caused to travel through a complete cycle of movement and the forward movement of the pusher member takes place substantially as the tray approaches alignment with the loading shelf A. It will be apparent that the loading device will also function equally satisfactory when the baking oven is of a type wherein the trays move continuously, and this may be accomplished by proper co-relation of the driving of the pusher member of the loading device with respect to the speed of travel of the conveyer.

Although we have herein shown and described a certain preferred embodiment of our invention, manifestly it is capable of modification and rearrangement of parts, without departing from the spirit and scope thereof. We do not, therefore, wish to be understood as limiting this invention to the precise form herein disclosed except as it may be so limited in the appended claims.

We claim as our invention:

1. A unitary, self-contained, portable loading device for use with a baking oven of the type comprising a baking chamber provided with a loading opening, a conveyer in the chamber adapted to travel in close proximity to the loading opening, and a substantially horizontally disposed shelf element associated with said opening and over which element pans of food stuff are adapted to be moved onto said conveyer; said loading device comprising a supporting frame, an auxiliary, horizontally extending shelf element fixedly mounted on the frame, adapted to be disposed in registered relation to the shelf element of the oven, whereby pans of food stuff may be initially supported on the shelf elements preparatory to feeding onto the conveyer, said loading device having extensions insertable into said opening and positionable adjacent said conveyer, means for engaging the pans and slidingly moving them over the shelf elements onto the conveyer, said means being cooperable with said extensions for moving substantially the combined length of the registered shelf elements, and power driven means on the frame structure for actuating said means.

2. A loading device for use with a baking oven of the type comprising a baking chamber provided with a loading opening, a conveyer in the chamber adapted to travel in close proximity to the loading opening, and a substantially horizontally disposed shelf associated with the opening and over which pans of food stuff are adapted to be moved onto said conveyer; said loading device comprising a supporting frame, an elongated member adapted to be disposed in and extending in the direction of the width of said opening, two sets of driving means carried on the frame and adapted to be registered with opposite ends of the opening and operably connected to the respective ends of said member for moving it forwardly and rearwardly in the opening, means for controlling the path of travel of said member and serving to cause said member to travel in close proximity to the shelf in a forwardly direction for engaging pans of food stuff on the shelf and moving them forwardly onto the conveyer and to cause said member to travel in an elevated relation to the shelf in a rearwardly direction, each set of driving means comprising an endless belt, and said control means comprising separate cam means adjacent each belt, and an arm for each cam means pivoted at one end to an adjacent belt, the opposite ends of said arms being connected to the ends of said elongated member, said arms each having a follower roller adapted to cooperate with a corresponding cam means to control the path of travel of said member, and motor driven means carried on the frame and operably connected to said sets of driving means for actuating them in synchronism.

3. A loading device for use with a baking oven of the type comprising a baking chamber provided with a loading opening, a conveyer in the chamber adapted to travel in close proximity to the loading opening, and a substantially horizontally disposed shelf associated with the opening and over which pans of food stuff are adapted to be moved onto said conveyer; said loading device comprising a supporting frame, an elongated member adapted to be disposed in and extending in the direction of the width of said opening, two sets of driving means carried on the frame and adapted to be registered with opposite ends of the opening and operably connected to the respective ends of said member for moving it forwardly and rearwardly in the opening, means for controlling the path of travel of said member and serving to cause said member to travel in close proximity to the shelf in a forwardly direction for engaging pans of food stuff on the shelf and moving them forwardly onto the conveyer and to cause said member to travel in an elevated relation to the shelf in a rearwardly direction, each set of driving means comprising an endless belt, and said control means comprising separate cam means adjacent each belt, and an arm for each cam means said arms being pivoted at one end to the adjacent belt and a follower roller on each arm for cooperating with a corresponding cam means, the opposite ends of said arms being inwardly offset and operably connected to the respective ends of said elongated member, and motor driven means carried on the frame and operably connected to said sets of driving means for actuating them in synchronism.

4. A loading device for use with a baking oven of the type comprising a baking chamber provided with a loading opening, a conveyer in the chamber adapted to travel in close proximity to the loading opening, and a substantially horizontally disposed shelf associated with the opening and over which pans of food stuff are adapted to be moved onto said conveyer; said loading device comprising a supporting frame, an elongated member adapted to be disposed in and extending in the direction of the width of said opening, two sets of driving means carried on the frame and adapted to be registered with opposite ends of the opening and operably connected to the respective ends of said member for moving it forwardly and rearwardly in the opening, means for controlling the path of travel of said member and serving to cause said member to travel in close proximity to the shelf in a forwardly direction for engaging pans of food stuff on the shelf and moving them forwardly onto the conveyer and to cause said member to travel in an elevated relation to the shelf in a rearwardly direction, each set of driving means comprising an endless belt, and said control means comprising separate cam means adjacent each belt, and an arm for each cam means pivoted at one end to an adjacent belt, the opposite ends of said arms being connected to the ends of said elongated member, said arms each having a follower roller adapted to cooperate with a corresponding cam means to control the path of travel of said member, and motor driven means carried on the frame and operably connected to said sets of driving means for actuating them in synchronism, the forward ends of said cam means being formed to cause said member to dwell for a short interval of time, at the end of its forward movement, prior to commencement of return movement.

5. A loading device for use with a baking oven of the type comprising a baking chamber provided with a loading opening, a conveyer in the chamber adapted to travel in close proximity to the loading opening, and a substantially horizontally disposed shelf associated with the opening and over which pans of food stuff are adapted to be moved onto said conveyer; said loading device comprising a supporting frame, an elongated cylindrical member adapted to be disposed in and extending in the direction of the width of said opening, two sets of driving means carried on the frame and adapted to be registered with opposite ends of the opening and operably connected to the respective ends of said member for moving it forwardly and rearwardly in the opening, means for controlling the path of travel of said member and serving to cause said member to travel in close proximity to the shelf in a forwardly direction for engaging pans of food stuff on the shelf and moving them forwardly onto the conveyer and to cause said member to travel in an elevated relation to the shelf in a rearwardly direction, each set of driving means comprising an endless belt, and said control means comprising separate cam means adjacent each belt, and an arm for each cam means pivoted at one end to an adjacent belt, the opposite ends of said arms being pivotally connected to the ends of said elongated member, said arms each having a follower roller adapted to cooperate with a corresponding cam means to control the path of travel of said member, and motor driven means carried on the frame and operably connected to said sets of driving means for actuating them in synchronism, the forward ends of said cam means being formed and dimensioned to cause said cylindrical member to engage and roll over said shelf during the final portion of the forward movement of said member.

6. In combination, a baking oven having a baking chamber formed with a loading opening at one end, a horizontally travelling conveyer in the chamber and having one end positioned to travel in close proximity to the loading opening, said conveyer comprising a multiplicity of spaced apart, individually pivoted trays for supporting pans of food stuffs while travelling in a substantially complete cycle around the conveyer, a horizontally extending shelf in the loading opening, located substantially midway between the upper and lower runs of the conveyer, whereby pans of food stuff may be shifted over said shelf onto said trays when the latter becomes substantially aligned with the shelf, and a power operated loading device associated with the loading opening of the oven and having a horizontally movable pusher member, actuated in timed relation to the conveyer, for engaging pans of food stuff on the shelf and shifting them onto an aligned tray of the conveyer.

7. In combination, a baking oven having a baking chamber formed with a loading opening at one end, a horizontally travelling conveyer in the chamber and having one end positioned to travel in close proximity to the loading opening, said conveyer comprising a multiplicity of spaced apart, individually pivoted trays for supporting pans of food stuffs while travelling in a substantially complete cycle around the conveyer, a horizontally extending shelf in the loading opening, located substantially midway between the upper and lower runs of the conveyer, whereby pans of food stuff may be shifted over said shelf onto said trays when the latter becomes substantially aligned with the shelf, the effective loading opening being of a height just sufficient to afford clearance for the pans when moved over the shelf onto an aligned tray, and a power operated loading device associated with the loading opening of the oven and having a horizontally movable pusher member, actuated in timed relation to the conveyer, for engaging pans of food stuff on the shelf and shifting them onto an aligned tray of the conveyer.

WILLIAM L. MUELLER.
CARL RICHARD SKARIN.

REFERENCES CITED

The following references are of record in the file of this patent:

UNITED STATES PATENTS

| Number | Name | Date |
|---|---|---|
| 795,141 | Lawrence | July 18, 1905 |
| 1,141,601 | Baker | Jan. 1, 1915 |
| 1,769,201 | Brandeen et al. | July 1, 1930 |
| 1,795,352 | Sundbom | Mar. 10, 1931 |
| 1,953,900 | Wolters | Apr. 3, 1934 |
| 2,236,281 | Anderson | Mar. 25, 1941 |
| 2,256,003 | Patterson | Sept. 16, 1941 |
| 2,359,583 | Reiner | Oct. 3, 1944 |

FOREIGN PATENTS

| Number | Country | Date |
|---|---|---|
| 556,318 | Germany | Aug. 6, 1932 |